Figure 1:
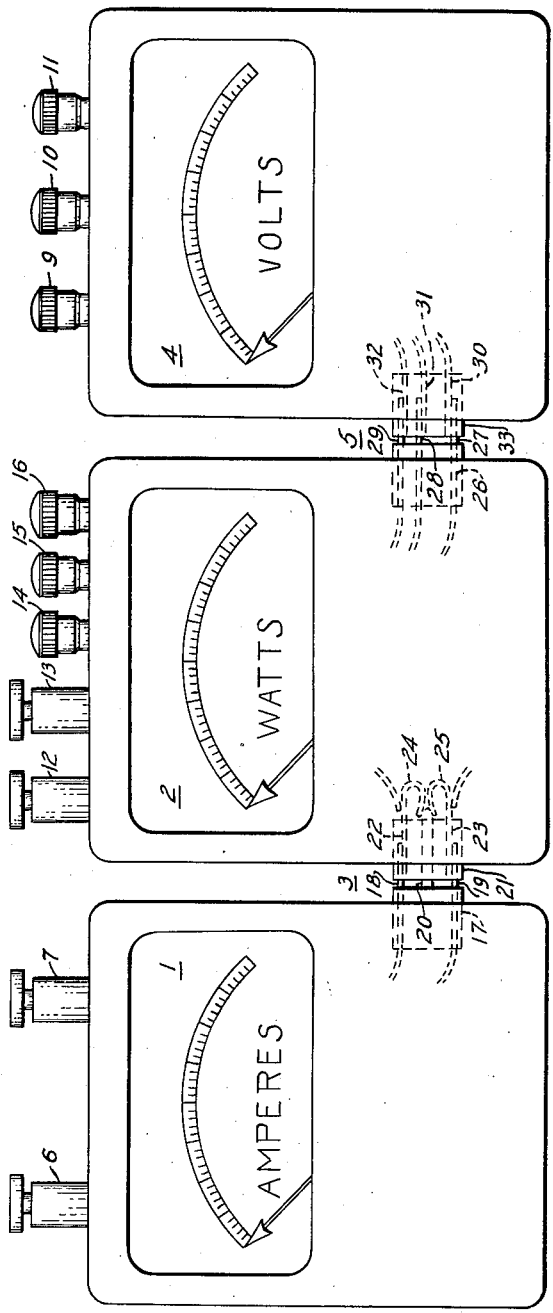

March 4, 1941.    U. L. SMITH    2,233,646
INTERCONNECTIBLE PORTABLE INDICATING INSTRUMENTS
Filed Oct. 26, 1939

WITNESSES:

INVENTOR
Uel L. Smith.
BY
ATTORNEY

Patented Mar. 4, 1941

2,233,646

UNITED STATES PATENT OFFICE 2,233,646

INTERCONNECTIBLE PORTABLE INDICATING INSTRUMENTS

Uel L. Smith, Morris Plains, N. J., assignor to Westinghouse Electric & Manufacturing Company, East Pittsburgh, Pa., a corporation of Pennsylvania Application October 26, 1939, Serial No. 301,399

3 Claims. (Cl. 171—95)

My invention relates to electrical indicating instruments and has particular relation to portable electrical instruments provided with means for convenient interconnection.

An object of my invention is to provide a group of electrical instruments of such construction that less than the total number required to test a circuit need be connected directly to such circuit.

Another object of my invention is to provide electrical measuring instruments which may be conveniently attached to each other in such manner that not all of them need be connected directly to the circuit undergoing measurement.

More specifically, it is an object of my invention to provide a group of instruments comprising a wattmeter, voltmeter and ammeter equipped with readily attachable plugs and sockets for interconnection in such manner that only the wattmeter alone or the voltmeter and ammeter together need be connected directly to a circuit in order to obtain readings of all three instruments.

Heretofore it has been usual to take readings of a number of quantities in an electric circuit to connect each of the instruments directly to the circuit undergoing test. Even where leads from some of these may be connected to the terminals of other of the instruments, as is sometimes the case, a tedious and time consuming process results. Under certain circumstances, an industrial analyzer such as that described in Lunas Patent No. 2,018,272 may be useful for making such measurements. Although such an analyzer permits readings of a plurality of instruments to be taken with only a single group of circuit connections, the instruments are permanently connected in a single assembly and are not adapted to be readily removed or separated for use individually.

According to my invention, I provide cooperating contact-making means of the plug-and-socket type on a group of electrical instruments such as might be used together to make a complete set of circuit measurements. To an instrument which is already connected directly to the circuit in question through the usual instrument terminals thereon, another instrument may be connected by means of a contact-making means, such as described above, without making any connections to its usual terminals. The preferred form of my invention, in which the contact-making means comprises a plug and a plug receptacle, or socket, carried directly on the casings of the respective instruments, results in a particularly compact and easily handled arrangement.

It is not my intention to claim broadly an electrical instrument provided with a contact plug and receptacle, since it is already known in the art to supply contact pins and a contact socket on an instrument in such manner that it may be plugged into an electric supply line and a load circuit plugged into it. My invention relates to interconnecting a plurality of instruments and apparatus susceptible to such use.

Figure 2:
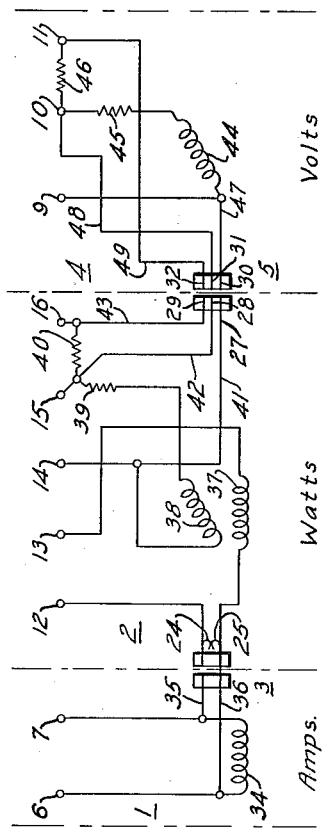

Other objects and advantages of my invention will become evident from the following detailed description taken in conjunction with the accompanying drawing, in which Figure 1 is a plan view of a group of instruments connected together in accordance with a preferred form of my invention, and Fig. 2 is a diagrammatic representation of the wiring arrangement employed in the form of my invention shown in Fig. 1.

The apparatus shown in Fig. 1 comprises an ammeter 1, a wattmeter 2, a contact assembly 3 interconnecting the ammeter 1 and the wattmeter 2, a voltmeter 4, and a second contact assembly 5 interconnecting the wattmeter 2 and the voltmeter 4.

The ammeter 1 is provided with the usual current terminals 6 and 7 while the voltmeter 4 is provided with the usual terminals 9, 10 and 11. The wattmeter 2 is likewise provided with current terminals 12 and 13 and voltage terminals 14, 15 and 16.

The contact assembly 3 includes a plug member 17 attached to the casing of the ammeter 1 and comprising contact blades 18 and 19 of resilient conducting material, and a stud 20 of insulating material. The receptacle or socket 21 of the connector assembly is carried by the casing of the wattmeter 2 and comprises a pair of contact blades or strips 22 and 23 having return-bent portions or jaws 24 and 25 biased to engage each other in circuit closing position but disposed to be separated by insulating stud 20 when the plug member 17 is inserted into the receptacle 21 in operative position, with the contact blades 18 and 19 resiliently engaging, respectively, the contact blades 22 and 23 within the socket 21.

The contact assembly 5 comprises a plug member 26 attached to the casing of the wattmeter 2 and carrying prongs or contact blades 27, 28 and 29 arranged to engage conducting strips 30, 31 and 32, respectively, disposed in the receptacle or socket 33 secured to the casing of the voltmeter 4 when in operative position.

Referring to Fig. 2 wherein the various parts are represented by the same numerals as in Fig. 1, the current coil 34 is connected across the terminals 6 and 7 of the ammeter 1. The plug contacts 18 and 19 are connected to the ammeter coil 34 by means of the leads 35 and 36.

The current coil 37 of the wattmeter 2 is connected across the current terminals 12 and 13 in series with the contacts 22 and 23 of the receptacle 21. The circuit through the coil 37 is maintained closed by means of the engaging jaws 24 and 25 when the ammeter 1 and wattmeter 2 are separated. Although the stud 20 of the plug member 17 is not shown in Fig. 2, it will be obvious that upon the connection of the plug and receptacle 21, the stud 20 will break the electrical connection between the jaws 24 and 25 and cause the current coils 34 and 37, of the ammeter and wattmeter to be placed in series circuit relation.

The voltage coil 38 of wattmeter 2 is connected across the terminals 14 and 15 in series with a resistance 39, while another resistance 40 interconnects the terminals 15 and 16 permitting a selection of the voltage range of the instrument in a manner well known in the art. In parallel with the leads to terminals 14, 15 and 16, connections are made to contact blades 27, 28 and 29 of the plug 26 by means of leads 41, 42 and 43, respectively.

The coil 44 of the voltmeter 4 is connected across the terminals 9 and 10 in series with a resistance 45 corresponding to the resistance 39 and the terminal 10 is interconnected with the terminal 11 through a resistance 46 similar to the resistance 40. In parallel with the leads to terminals 9, 10 and 11, connections are made to the contact blades 30, 31 and 32, respectively, of the socket 33, by means of leads 47, 48 and 49.

From the above description, it will become obvious that with the ammeter 1 and wattmeter 2 interconnected through the contact assembly 3, connection of the current leads to either pair of terminals 6—7 or 12—13 will result in energization of the current coils 34 and 37 of both instruments. Likewise with the wattmeter 2 and voltmeter 4 interconnected through the contact assembly 5, connection of the voltage leads either through terminals 9 and 10 or 11, or through terminals 14 and 15 or 16, will result in the voltage coils 38 and 44 of both instruments being energized at the same potential. Thus with the wattmeter 2 connected directly to the circuit undergoing measurement by means of its usual terminals 12—16, either or both the ammeter 1 and the voltmeter 4 may be placed in operative arrangement through the respective plug and receptacle assemblies 3 and 5. Likewise, with the voltmeter and ammeter connected directly to the line through their respective terminals, the wattmeter 2 may be placed in operative condition by connecting it to both other instruments by means of contact assemblies 3 and 5.

Although I have shown and described certain specific embodiments of my invention, it will be understood that it is not to be restricted to electrical instruments of any particular types or constructions nor to the specific arrangement of parts or circuit connections herein set forth. I desire, therefore, that only such limitations shall be imposed on the invention as are set forth in the appended claims.

I claim as my invention:

1. A multi-unit electrical measuring apparatus, comprising a primary unit including means responsive to an electrical characteristic and lead-in terminals thereto, contact means including one unit of a separable plug and socket assembly connectable into a circuit of said primary unit, a secondary unit including means for measuring an electrical characteristic and lead-in terminals thereto, and contact means complementary to the contact means of the primary unit connected into a circuit of said secondary unit, whereby said secondary unit may be selectively connected to said circuit of the primary unit for simultaneous indication of different electrical characteristics on the two units.

2. A multi-unit electrical measuring apparatus, comprising a primary unit including a casing, means therein responsive to an electrical characteristic, and lead-in terminals thereto provided on the casing, said primary unit being provided with contact means comprising one unit of a separable plug and socket assembly secured to said casing, said contact means being electrically connected into a circuit of said primary unit, one or more secondary units each comprising a casing, means therein for measuring an electrical characteristic, lead-in terminals thereto provided on the casing, and contact means complementary to the contact means of the primary unit and electrically connected into the circuit of said secondary unit, whereby said contact means may be interconnected to selectively connect a circuit of a secondary unit to the circuit of said primary unit for simultaneous indication of various electrical characteristics on said units.

3. A multi-unit electrical measuring apparatus, comprising a power measuring unit, a current measuring unit, a voltage measuring unit, lead-in terminals on each of said units, a pair of contact means each comprising a pair of detachablly connectable portions, one portion of each of said contact means being electrically connected to the circuit of said power measuring unit and each of the complementary portions thereof being electrically connected to the circuit of a different one of said other instruments, whereby said current measuring unit and said voltage measuring unit may be selectively interconnected to the circuit of said power measuring unit for simultaneous indication of the various electrical characteristics on the several units.

UEL L. SMITH.